United States Patent
Lee et al.

(10) Patent No.: US 10,119,861 B2
(45) Date of Patent: Nov. 6, 2018

(54) LAMELLAR GRATING INTERFEROMETER HAVING STRESS-DISPERSIBLE SUPPORT STRUCTURE

(71) Applicant: AGENCY FOR DEFENSE DEVELOPMENT, Daejeon (KR)

(72) Inventors: Jaehwan Lee, Daejeon (KR); Youngil Kang, Daejeon (KR); Jongmin Lee, Sejong-si (KR); Incheol Kim, Gyeongsangbuk-do (KR); Dohyun Park, Gyeonggi-do (KR)

(73) Assignee: AGENCY FOR DEFENSE DEVELOPMENT (KR)

( * ) Notice: Subject to any disclaimer, the term of this patent is extended or adjusted under 35 U.S.C. 154(b) by 0 days.

(21) Appl. No.: 15/653,945

(22) Filed: Jul. 19, 2017

(65) Prior Publication Data
US 2018/0149518 A1    May 31, 2018

(30) Foreign Application Priority Data
Nov. 29, 2016 (KR) .......................... 10-2016-0160623

(51) Int. Cl.
  *G01J 3/26* (2006.01)
  *G01J 3/02* (2006.01)
  *G01J 3/12* (2006.01)
(52) U.S. Cl.
  CPC ............. *G01J 3/0202* (2013.01); *G01J 3/26* (2013.01); *G01J 2003/1204* (2013.01)
(58) Field of Classification Search
  CPC ..... G01J 3/0202; G01J 3/26; G01J 2003/1204
  See application file for complete search history.

(56) References Cited

U.S. PATENT DOCUMENTS

2007/0159635 A1* 7/2007 Urey .................... G01J 3/4532
                                                        356/451

OTHER PUBLICATIONS

Office Action dated Feb. 2, 2018 in corresponding Korean Application No. 10-2016-0160623.
Caglar Ataman, et al., "A Fourier Transform Spectrometer Using Resonant Vertical Comb Actuators," Journal of Micromechanics and Microengineering, 16 (2006), pp. 2517-2523.

* cited by examiner

*Primary Examiner* — Mark R Gaworecki
(74) *Attorney, Agent, or Firm* — Ostrolenk Faber LLP (57) ABSTRACT

The present invention relates to a lamella grating interferometer capable of being employed in a Fourier transform infrared (FTIR) spectrometer, the interferometer including a reflective surface in a circular shape and provided with a fixed portion including fixed mirrors and a movable portion including movable mirrors that are arranged with the fixed mirrors in a crossing manner to form a lamella structure with the fixed mirrors, a plurality of driving units disposed at outside the reflective surface and configured to apply driving forces for moving the movable portion, and a plurality of driving arms connecting the driving units to the movable portion of the reflective surface, respectively, and configured to move the movable portion in response to the driving forces applied by the driving units, wherein each of the plurality of driving arms is formed in a structure of repeating a preset bent shape plural times.

5 Claims, 6 Drawing Sheets

LAMELLAR GRATING INTERFEROMETER HAVING STRESS-DISPERSIBLE SUPPORT STRUCTURE

CROSS-REFERENCE TO RELATED APPLICATION

Pursuant to 35 U.S.C. § 119(a), this application claims the benefit of earlier filing date and right of priority to Korean Application No. 10-2016-0160623, filed on Nov. 29, 2016, the contents of which is incorporated by reference herein in its entirety.

BACKGROUND OF THE INVENTION

1. Field of the Invention

This specification relates to a lamellar grating interferometer applicable to a fourier transform infrared (FTIR) spectrometer.

2. Background of the Invention

A lamellar grating interferometer applied to a Fourier Transform InfraRed (FTIR) spectrometer generally includes a reflective surface on which a stationary fixed portion (stationary mirror) and a movable portion (movable mirror) are arranged in a crossing manner, a driving unit applying a moving force for moving the movable portion of the reflective surface, and a driving arm connecting the driving unit and the movable portion.

Beams incident on the fixed portion and the movable portion (referred to as a 'reflective surface') are reflected on the reflective surface. In this instance, interference is caused due to a relative path difference of the beams reflected from the fixed portion and the moved movable portion, respectively. The interference is measured using a detector and an interference signal is obtained accordingly.

Such a lamellar grating interferometer is advantageous for a miniaturization of a spectrometer in terms of relatively reducing a number of optical components and simplifying a structure, compared to the related art Michelson interferometer.

On the other hand, the lamellar grating interferometer fabricated on the basis of Micro Electro Mechanical Systems (MEMS) is difficult to increase the size of the reflective surface by a predetermined level or more due to the MEMS-based fabrication. Further, as the size of the reflective surface increases, stress concentrated on the driving arm supporting the movable portion of the reflective surface becomes stronger. Accordingly, the movable distance is limited.

Figure 1:
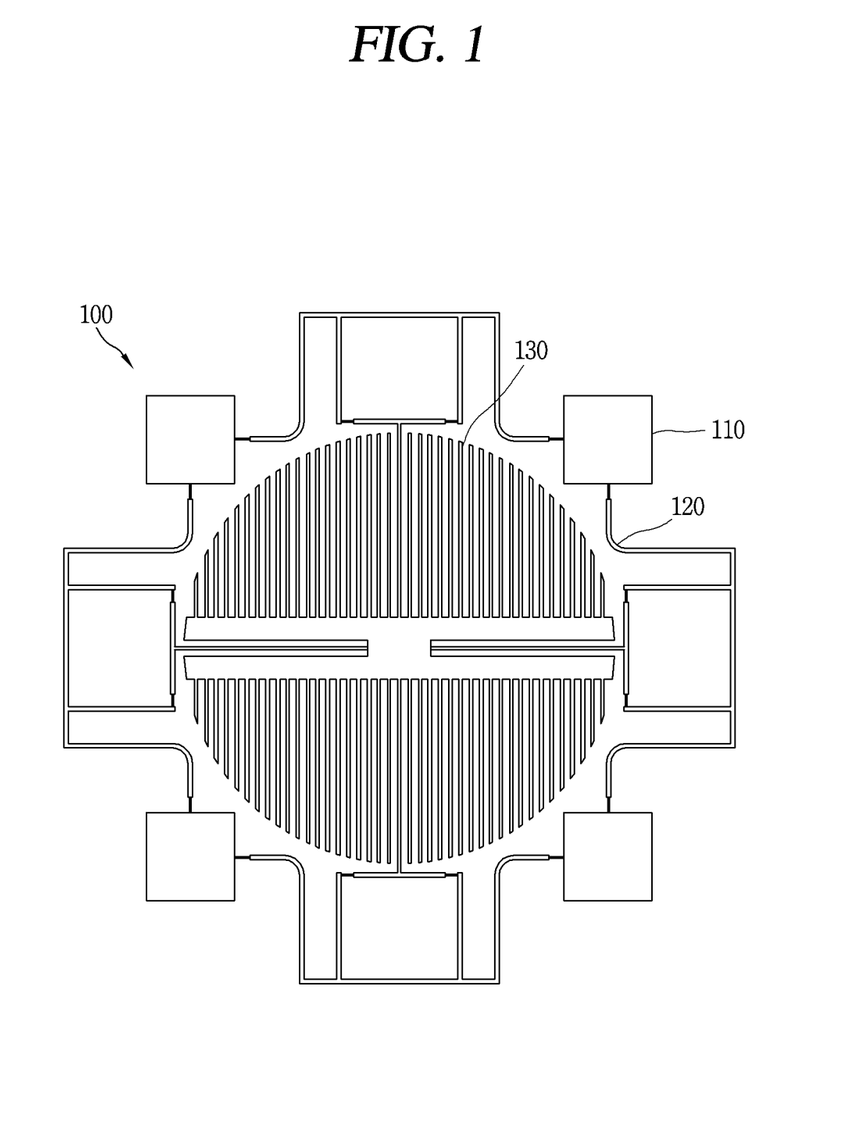
FIG. 1 is a view illustrating a structure of the related art lamellar grating interferometer.

FIG. 1 is a view illustrating a structure of the related art lamellar grating interferometer 100.

As illustrated in FIG. 1, the related art lamellar grating interferometer 100 includes a reflective surface 130 including movable mirrors (movable portion) and fixed mirrors (fixed portion; not illustrated), a plurality of driving units 110 each applying driving force for moving the movable portion, and a plurality of moving arms 120 connecting the driving units 110 and the movable portion of the reflective surface 130 and supporting the movable portion during the movement of the movable portion.

Meanwhile, a movable distance of the movable portion of the reflective surface 130 may be decided according to an endurance limit of the driving arms 120 supporting the movable portion. This is because stronger stress is concentrated on the driving arms 120 as the movable distance of the movable portion becomes longer, and the driving arms 120 are broken when stress exceeding the endurance limit of the driving arms 120 is applied.

Therefore, active researches are undergoing on a method of increasing the movable distance of the movable portion within the endurance limit, which refers to a maximum stress that the driving arms 120 may not be broken.

SUMMARY OF THE INVENTION

Therefore, to obviate the aforementioned problems and other drawbacks, an aspect of the detailed description is to provide an MEMS-based lamellar grating interferometer, capable of ensuring more improved resolution for an FTIR spectrometer.

To achieve these and other advantages and in accordance with the purpose of this specification, as embodied and broadly described herein, there is provided a lamella grating interferometer, including a reflective surface in a circular shape and provided with a fixed portion including fixed mirrors and a movable portion including movable mirrors that are arranged with the fixed mirrors in a crossing manner to form a lamella structure with the fixed mirrors, a plurality of driving units disposed at outside the reflective surface and configured to apply driving forces for moving the movable portion, and a plurality of driving arms connecting the driving units to the movable portion of the reflective surface, respectively, and configured to move the movable portion in response to the driving forces applied by the driving units, wherein each of the plurality of driving arms is formed in a structure of repeating a preset bent shape plural times.

In one embodiment disclosed herein, the preset shape may be a spring shape capable of absorbing impact or pressure.

In one embodiment disclosed herein, the preset shape may be a shape like '⊐'.

In one embodiment disclosed herein, the plurality of driving arms may be configured in a structure of repeating the preset shape as many as possible in a non-overlapping manner within a plurality of regions, respectively. Here, the plurality of regions may be generated by dividing a region around the reflective surface between the reflective surface and the plurality of driving units according to a number of the driving unit.

In one embodiment disclosed herein, the lamellar grating interferometer may be fabricated based on Micro Electro Mechanical Systems (MEMS).

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

It should be noted that technological terms used herein are merely used to describe a specific embodiment, but not to limit the present invention. The expression in the singular form in this specification will cover the expression in the plural form unless otherwise indicated obviously from the context. In this application, the terms "comprising" and "including" should not be construed to necessarily include all of the elements or steps disclosed herein, and should be construed not to include some of the elements or steps thereof, or should be construed to further include additional elements or steps.

In describing the present disclosure, moreover, the detailed description will be omitted when a specific description for publicly known technologies to which the invention pertains is judged to obscure the gist of the present disclosure.

Hereinafter, embodiments disclosed herein will be described in detail with reference to the accompanying drawings.

Figure 2:
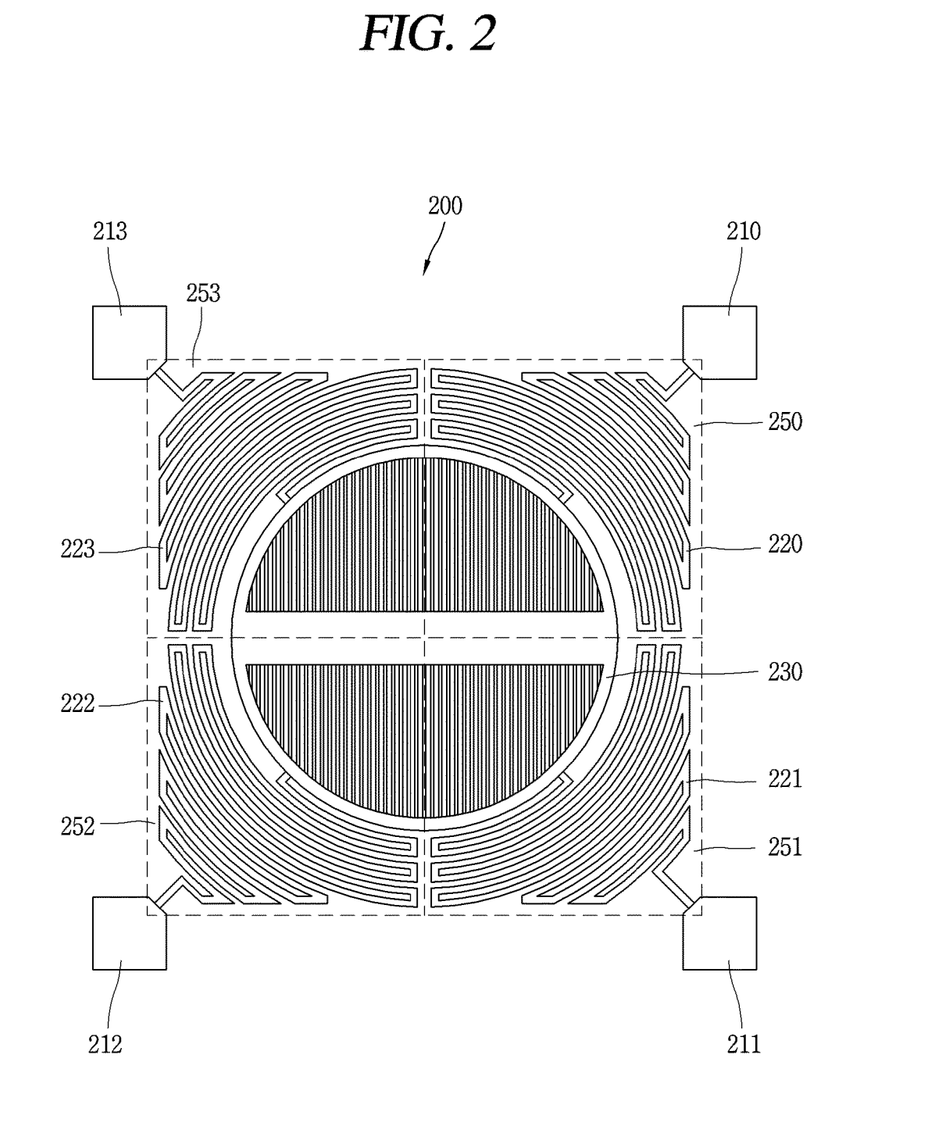
FIG. 2 is a view illustrating a structure of a lamellar grating interferometer in accordance with an embodiment of the present invention.

First, FIG. 2 is a view illustrating a structure of a lamellar grating interferometer 200 in accordance with an embodiment of the present invention.

As illustrated in FIG. 2, a lamellar grating interferometer 200 according to an embodiment of the present invention may include a reflective surface 230 in a circular shape forming a lamellar structure in which fixed mirrors (fixed portion: not illustrated) and movable mirrors (movable portion) are arranged in a crossing manner. The lamellar grating interferometer 200 may also include a plurality of driving units 210, 211, 212 and 213 provided at outside of the reflective surface 230 to apply driving force for moving the movable portion, and driving arms 220, 221, 222, 223 connecting the driving units 210, 211, 212 and 213 to the movable portion of the reflective surface 230, respectively.

The plurality of driving units 210, 211, 212, and 213 may be spaced apart from the reflective surface 230 by predetermined distances. A region between the reflective surface 230 and the plurality of driving units 210, 211, 212, and 213, that is, a region around the reflective surface 230 may be divided into a plurality of regions according to a number of the driving unit. For example, when the four driving units 210, 211, 212 and 213 are disposed as illustrated in FIG. 2, the region between the reflective surface 230 and the four driving units 210, 211, 212 and 213 may be divided into four spaces 250, 251, 252, and 253, and each space may correspond to each of the driving units 210, 211, 212, and 213.

In the lamellar grating interferometer 200 according to the embodiment of the present invention, the respective driving arms 220, 221, 222, 222 connecting the driving units 210, 211, 212, 213 to the movable portion of the reflective surface 230 may be formed in a shape of occupying the spaces 250, 251, 252, 253 corresponding to the respective drivers 210, 211, 212, and 213 in a manner of repeatedly forming a shape like 'ㄹ'. That is, the lamellar grating interferometer 200 according to the embodiment of the present invention may be configured such that each of the driving arms 220, 221, 222, and 223 connecting the respective driving units 210, 211, 212, 221, 222, and 223 to the movable portion of the reflecting surface 230 repeatedly forms the preset shape as much as possible in a non-overlapping manner within the preset space. This may allow a maximization of a length of each driving arm 220, 221, 222, 223.

Accordingly, the present invention can maximize the length of each of the driving arms supporting the movable portion even in a limited space even under the miniaturized structure of the lamellar grating interferometer, so that stress concentrated on the driving arms can be dispersed as much as possible. In the lamellar grating interferometer 200 according to the embodiment of the present invention, a movable distance of the movable portion can more increase according to weaker stress applied to the driving arm and an endurance limit of the driving arm. Consequently, resolution of an FTIR spectrometer using the lamellar grating interferometer according to the embodiment of the present invention can be further improved by increasing the movable distance of movable portion.

Hereinafter, description will be given of comparing an example in which the movable portion is moved in the lamellar grating interferometer 200 according to the embodiment of the present invention, with an example in which the movable portion is moved in the related art lamellar grating interferometer 100 according to the related art illustrated in FIG. 1, with reference to FIGS. 3 to 6.

Figure 3:
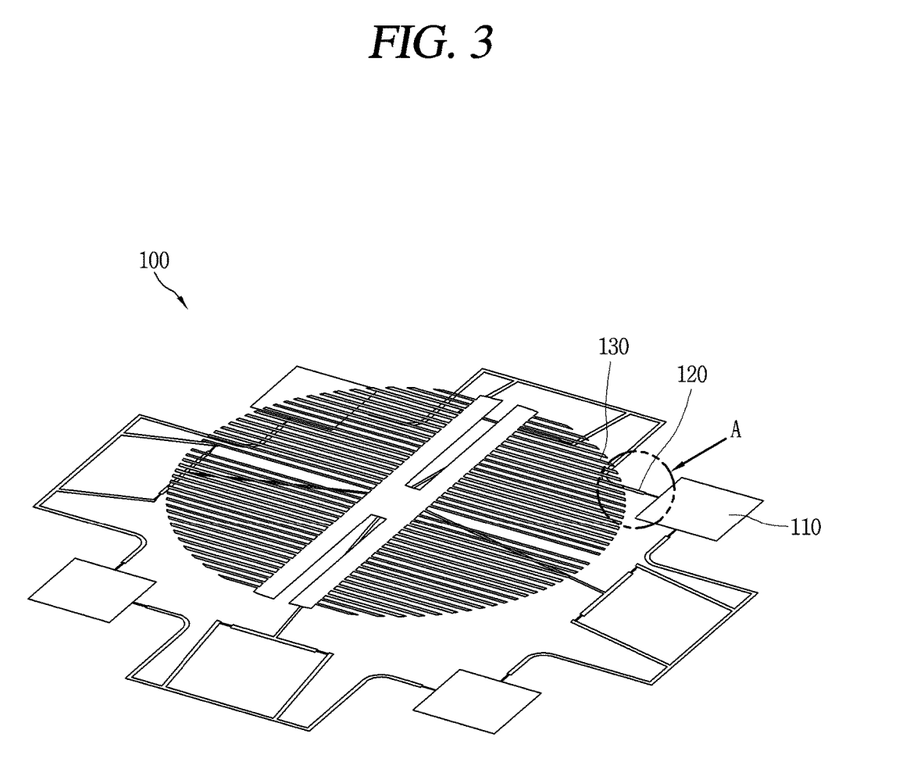
FIG. 3 is an exemplary view illustrating an example in which a movable portion of a reflective surface is moved in the related art lamellar grating interferometer.

First, FIG. 3 is a view illustrating an example in which the movable portion of the reflective surface 130 is moved in the related art lamellar grating interferometer 100.

As illustrated in FIG. 3, in the related art lamellar grating interferometer 100, when power is supplied through the plurality of driving units 110, the driving arms 120 that connect the driving units 110 to the movable portion of the reflective surface 130, respectively, push up the movable portion of the reflective surface 130 and thus the movable portion of the reflective surface 130 is moved. Accordingly, the driving arms 120 are subjected to stress due to the movement of the movable portion of the reflective surface 130.

Figure 4:
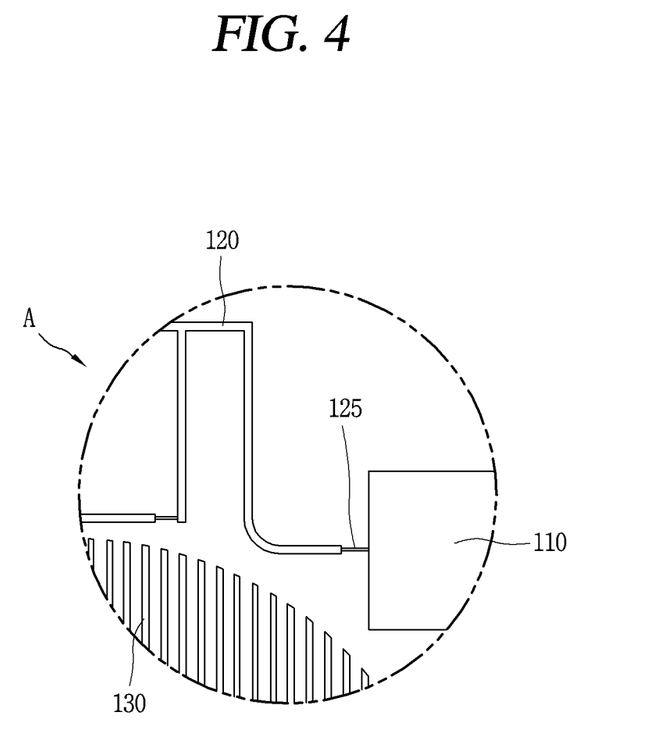
FIG. 4 is a view illustrating in more detail a portion of a driving arm on which stress is concentrated in the related art lamellar grating interferometer.

Meanwhile, FIG. 4 illustrates in more detail the driving arm 120 connected to the movable portion of the reflective surface 130 of the related art lamellar grating interferometer 100.

Referring to FIG. 4, it can be noticed that the related art lamellar grating interferometer 100 is configured such that the driving arm 120 and the movable portion of the reflective surface 130 are connected by a simple linear structure in a shape of a cantilever. Accordingly, the stress due to the movement of the movable portion of the reflective surface 130 is applied to the driving arm 120, and a connection portion 125 between the driving unit 110 and the driving arm 120, namely, a stress-concentrated portion is easily broken.

Figure 5:
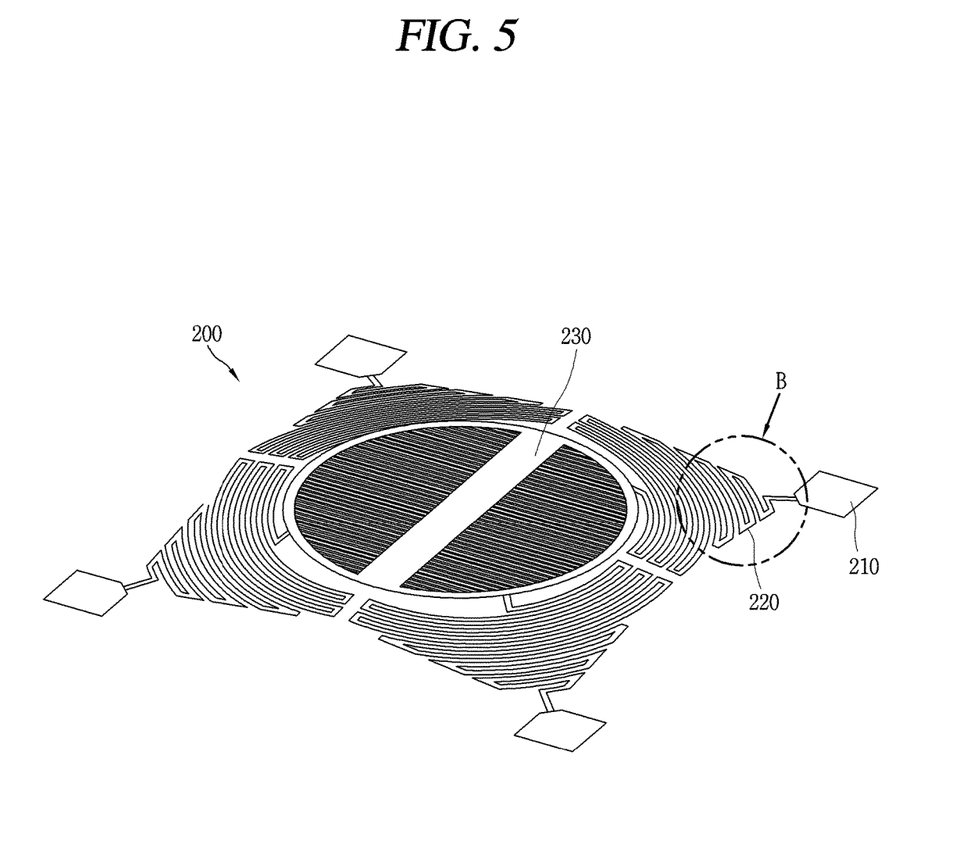
FIG. 5 is an exemplary view illustrating an example in which a movable portion of a reflective surface is moved in a lamellar grating interferometer in accordance with an embodiment of the present invention.

On the other hand, FIG. 5 is an exemplary view illustrating an example in which the movable portion of the reflective surface 230 is moved in the lamellar grating interferometer 200 according to the embodiment of the present invention.

Referring to FIG. 5, when power is supplied through the plurality of driving units 210, 211, 212, and 213 in the lamellar grating interferometer 200 according to the embodiment of the present invention, similar to the related art structure, the driving arms 220, 221, 222 and 223 connecting the movable portion of the reflective surface 230 with the driving units 210, 211, 212, and 213 push up the movable portion of the reflective surface 230 and thus the movable portion of the reflective surface 230 is moved.

However, according to the present invention, as illustrated in FIG. 2, the driving arms 220, 221, 222 and 223 for connecting the driving units 210, 211, 212 and 213 to the movable portion of the reflective surface 230, respectively, are formed by occupying the regions 250, 251, 252, and 253 corresponding to the respective driving units 210, 211, 212, and 213 in the manner of repeating the preset shape. Accordingly, in the lamellar grating interferometer according to the embodiment of the present invention, the stress applied to the driving arm can be remarkably reduced and the length of the driving arm connecting the driving unit and the movable portion of the reflective surface can greatly increase, as compared with the related art one.

Also, according to the present invention, the driving arm may be formed in a structure of repeating a preset shape similar to a spring shape, such as the shape of 'ⴶ'. That is, according to the present invention, since the driving arm supporting the movable portion of the reflective surface forms the spring shape capable of absorbing impact or pressure, an effect of reducing the stress applied to the driving arm can be more improved. That is, according to the present invention, an effect of dispersing the stress applied to the driving arm can be obtained not only by the extended length of the driving arm, but also by the preset shape of the extended driving arm, that is, the spring shape.

Figure 6:
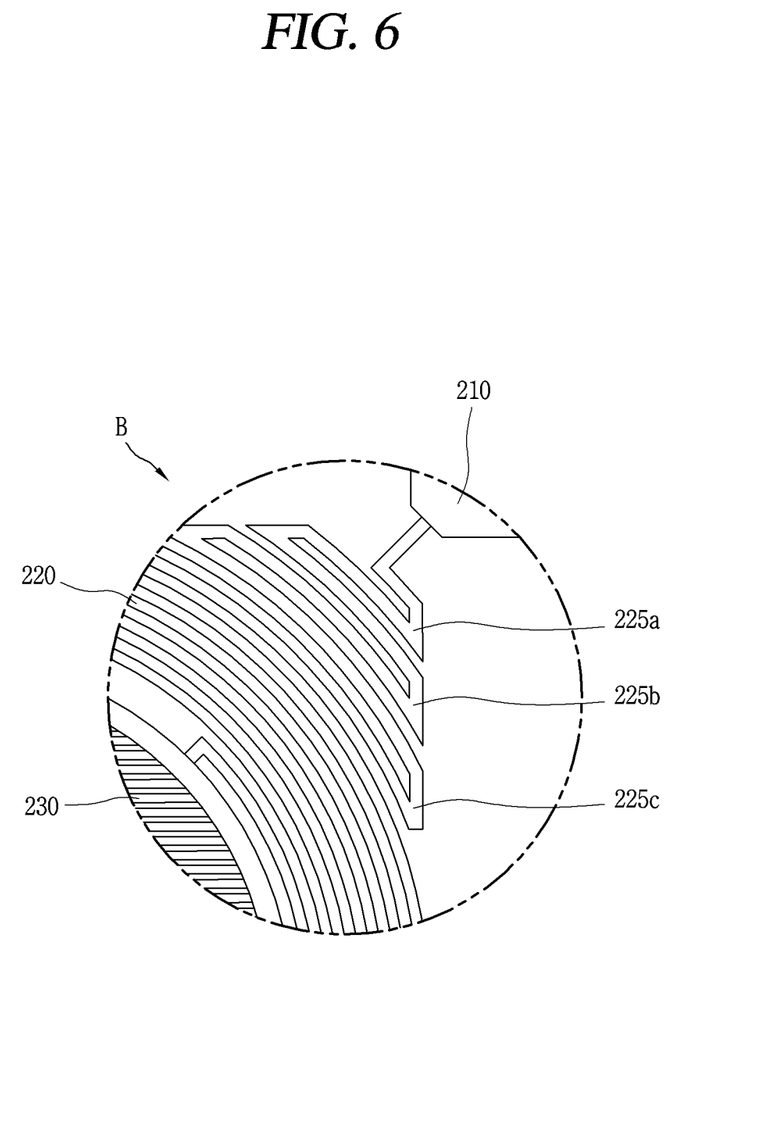
FIG. 6 is a view illustrating in more detail a portion of a driving arm on which stress is concentrated in a lamellar grating interferometer in accordance with an embodiment of the present invention.

FIG. 6 illustrates in more detail a structural part of the driving arm 220 to which stress is applied in the lamellar grating interferometer 200 according to the embodiment of the present invention.

Referring to FIG. 6, it can be noticed that the driving arm 220 of the lamellar grating interferometer 200 according to the embodiment of the present invention is bent into the shape like 'ⴶ' plural times to connect the movable portion of the reflective surface 230 with the driving unit 210. As the driving arm 220 of the lamellar grating interferometer 200 according to the embodiment of the present invention is formed in the bent manner, a distance between the movable portion of the reflective surface 230 and the driving unit 210 can be maximized, which may result in dispersing pressure, namely, stress applied to a predetermined area of the driving arm 220 due to the movement of the movable portion. Therefore, the pressure, i.e., the stress, applied to the predetermined area of the driving arm 220 of the lamellar grating interferometer 200 according to the embodiment of the present invention can be significantly reduced, as compared to the driving arm 120 of the related art lamellar grating interferometer 100.

In the present invention, since the driving arm 220 is bent into the shape of 'ⴶ' plural times, a portion where stress can be concentrated may be dispersed between the driving arm 220 and the movable portion of the reflective surface 230. For example, in the related art lamellar grating interferometer 100 illustrated in FIG. 1, the stress applied to the driving arm 120 may generally be concentrated on a connection portion (125 in FIG. 4) that is connected to the driving unit 110.

On the contrary, the lamellar grating interferometer 200 according to the embodiment of the present invention, as illustrated in FIG. 6, may have a plurality of bent points (bent portions, 225a, 225b, and 225c) due to the shape of 'ⴶ'. The stress applied to the driving arm 220 can be dispersed by the bent points 225a, 225b, and 225c.

Actually, in the related art lamellar grating interferometer 100 as illustrated in FIG. 1, according to a test result of moving the movable portion of the reflective surface 130, stress measured on the driving arm 120 of the related art lamellar grating interferometer 100 was 60 Mpa. On the other hand, according to a test result in the lamellar grating interferometer 200 of the present invention, stress measured on the driving arm 220 of the lamellar grating interferometer 200 was 30 MPa.

Therefore, in the lamellar grating interferometer 200 according to the embodiment of the present invention, when the movable portion is moved by the endurance limit of the driving arm, the movable distance of the movable portion can be longer than a movable distance of the movable portion of the related art lamellar grating interferometer 100. Consequently, the present invention can improve the resolution of the FTIR spectrometer while using the same number of driving units and driving arms and maintaining the same size of the reflective surface.

While the foregoing description has been given of the detailed embodiment, it will be understood by those skilled in the art that various changes and modifications may be made without departing from the spirit and scope of the invention. In particular, in the embodiment of the present invention, the example in which the driving arm repeatedly forms the shape of 'ⴶ' to connect the movable portion of the reflective surface and the driving unit has been described. However, the present invention is not limited thereto. That is, if there is a more suitable shape capable of dispersing stress, the driving arm can alternatively be configured to repeatedly form the more suitable shape, within a preset space limited by a number of driving units arranged at outside of the reflective surface and a preset region around the reflective surface.

The effect of the lamellar grating interferometer according to the present invention will be described as follows.

According to at least one of the embodiments of the present invention, the length of the driving arm can extend as long as possible within a limited space, thereby dispersing stress concentrated on the driving arm. Accordingly, the movable distance of the movable portion according to the endurance limit of the driving arm can more increase, thereby further improving the resolution of the FTIR spectroscope.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents

What is claimed is:

1. A lamella grating interferometer employed in a Fourier transform infrared (FTIR) spectrometer, the interferometer comprising:

a reflective surface in a circular shape and provided with a fixed portion including fixed mirrors and a movable portion including movable mirrors that are arranged with the fixed mirrors in a crossing manner to form a lamella structure with the fixed mirrors;

a plurality of driving units disposed at outside the reflective surface and configured to apply driving forces for moving the movable portion; and a plurality of driving arms connecting the driving units to the movable portion of the reflective surface, respectively, and configured to move the movable portion in response to the driving forces applied by the driving units, wherein each of the plurality of driving arms is formed in a structure of repeating a preset bent shape plural times.

2. The interferometer of claim 1, wherein the preset shape is a spring shape capable of absorbing impact or pressure.

3. The interferometer of claim 2, wherein the preset shape is a shape like 'ㄹ'.

4. The interferometer of claim 1, wherein the plurality of driving arms are configured in a structure of repeating the preset shape as many as possible in a non-overlapping manner within a plurality of regions, respectively, the plurality of regions being generated by dividing a region around the reflective surface between the reflective surface and the plurality of driving units according to a number of the driving unit.

5. The interferometer of claim 1, wherein the lamellar grating interferometer is fabricated based on Micro Electro Mechanical Systems (MEMS).

* * * * *